United States Patent [19]

Williams et al.

[11] Patent Number: 5,506,007
[45] Date of Patent: Apr. 9, 1996

[54] POLYMERIZATION OF SYSTEMS USING A DEOXYGENATED MEDIUM

[75] Inventors: Jerry W. Williams, Cottage Grove; George V. D. Tiers, St. Paul; Jeanne M. Goetzke, Woodbury; Gerald L. Uhl, St. Paul, all of Minn.

[73] Assignee: Minnesota Mining and Manufacturing Company, St. Paul, Minn.

[21] Appl. No.: 510,475

[22] Filed: Aug. 2, 1995

[51] Int. Cl.$^6$ ............................................. C08J 7/04
[52] U.S. Cl. .................. 427/495; 427/385.5; 427/430.1; 427/512; 427/553; 427/558; 427/559; 427/581
[58] Field of Search ................................ 427/495, 512, 427/553, 558, 559, 581, 385.5, 430.1

[56] References Cited

U.S. PATENT DOCUMENTS

| | | | |
|---|---|---|---|
| 3,615,972 | 10/1971 | Morehouse, Jr. et al. | 156/79 |
| 4,075,238 | 2/1978 | Mark et al. | 260/458 |
| 4,287,308 | 9/1981 | Nakayama et al. | 521/53 |
| 4,415,615 | 11/1983 | Esmay et al. | 428/40 |
| 4,513,039 | 4/1985 | Esmay | 428/40 |
| 4,710,536 | 12/1987 | Klingen et al. | 524/493 |
| 4,749,590 | 6/1988 | Klingen et al. | 427/54.1 |
| 4,975,300 | 12/1990 | Deviny | 427/54.1 |

FOREIGN PATENT DOCUMENTS

| | | | |
|---|---|---|---|
| 4-41576 | 2/1992 | Japan | C09J 7/02 |
| 5-5014 | 1/1993 | Japan | C09J 4/02 |
| WO84/03837 | 10/1984 | WIPO | C09J 3/14 |

*Primary Examiner*—Bernard Pianalto
*Attorney, Agent, or Firm*—Gary L. Griswold; Walter N. Kirn; Carolyn V. Peters

[57] ABSTRACT

A process for polymerizing a free-radically polymerizable composition comprising the steps:

(a) coating a coatable free-radically polymerizable mixture onto at least one major surface of a web;

(b) deoxygenating a liquid inerting medium;

(c) immersing the coated web into the deoxygenated liquid inerting medium; and (d) irradiating the immersed coated web with actinic radiation sufficient to effect polymerization of the free-radically polymerizable mixture, while maintaining the liquid inerting medium in an essentially oxygen-free state.

9 Claims, No Drawings

5,506,007

POLYMERIZATION OF SYSTEMS USING A DEOXYGENATED MEDIUM

TECHNICAL FIELD

This invention relates to a process for polymerizing free-radically polymerizable monomers, and in particular polymerizing free-radically polymerizable monomers using a deoxygenated liquid as an inerting medium.

BACKGROUND OF THE INVENTION

A number of modifications and variations of UV-light based polymerization processes are known in which adhesive compositions are coated onto a web and then polymerized using UV irradiation (See, for example, U.S. Pat. Nos. 4,415,615 and 4,513,039). Such polymerizations are normally carried out using an inert atmosphere that can be achieved either by using an oxygen free atmosphere (See, for example, Japanese Kokai No HEI 5-5014) or by using a cover sheet that excludes oxygen.

Alternatively, an adhesive can be prepared by coating the polymerization mixture onto a web and polymerizing via UV irradiation, wherein the polymerization step is carried out while the coated web is immersed in water. (See, for example, Japanese Kokai No. HEI 4-41576). When the coated web is immersed no polymerization obstruction by oxygen is said to occur.

In view of the foregoing discussed limitations of conventional on-web polymerization processes, improvements are continuously desired and sought by those within the industry. It was against this background that an improved polymerization process for producing adhesives and, in particular, acrylic-based adhesives and tapes, was sought.

SUMMARY OF THE INVENTION

Briefly, in one aspect of the present invention a process for polymerizing free-radically polymerizable compositions is provided comprising the steps:

(a) coating a coatable free-radically polymerizable mixture onto at least one major surface of a web;

(b) deoxygenating a liquid inerting medium;

(c) immersing the coated web into the deoxygenated liquid inerting medium; and (d) irradiating the immersed coated web with actinic radiation sufficient to effect polymerization of the free-radically polymerizable mixture coated thereon, while maintaining the liquid inerting medium in an essentially oxygen-free state.

The coatable free-radically polymerizable mixture comprises (1) at least one free-radically polymerizable monomer, (2) optionally, a viscosity modifier, (3) a catalytically effective amount of a free radical photoinitiator, and (4) optional additives.

Advantageously, the present process allows for fabrication of a coated article using a single substrate, thus conserving resources. Furthermore, the use of a liquid inerting medium provides the added advantage of efficient heat transfer of the heat of polymerization. Another advantage is that the liquid inerting medium is not significantly depleted during the process, unlike a process using a gaseous inerting medium. In present process, the liquid inerting medium is (1) water, (2) a concentrated aqueous salt solution, (3) an organic solvent, or (4) a combination thereof.

Further, the process provides that a polar, water-soluble organic monomer can exhibit an equilibrium constant of less than 0.7, preferably less than 0.5, most preferably less than 0.3 when partitioned between a non-polar organic monomer and the concentrated aqueous salt solution.

Alternatively, a concentrated aqueous salt solution can be chosen so a polar, water-soluble organic monomer exhibits an equilibrium constant of less than 0.7, preferably less than 0.5, most preferably less than 0.3 when partitioned between a non-polar organic monomer and the concentrated aqueous salt solution.

As used in this application:

"coatable" means a composition having a sufficient viscosity such that the coating remains on the web for the time period between coating the web and polymerization of the coating on the immersed coated web;

"deoxygenated liquid" means a liquid essentially free of dissolved molecular oxygen, such that the dissolved oxygen concentration is 200 ppm or less v/v, preferably 100 ppm or less v/v, and more preferably 50 ppm or less v/v; and "inerting medium" means a medium essentially free of dissolved molecular oxygen.

DESCRIPTION OF THE PREFERRED EMBODIMENT(S)

The present process may be used to manufacture many different types of tapes.

The process of the present invention for polymerizing free-radically polymerizable compositions comprises the steps:

(a) coating a coatable free-radically polymerizable mixture onto at least one major surface of a web;

(b) deoxygenating a liquid inerting medium;

(c) immersing the coated web into the deoxygenated liquid inerting medium; and (d) irradiating the immersed coated web with actinic radiation sufficient to effect polymerization of the free-radically polymerizable mixture coated thereon, while maintaining the liquid inerting medium in an essentially oxygen-free state.

Free-Radically Polymerizable Mixture

A coatable free-radically polymerizable monomeric mixture or partially prepolymerized syrup can be made by combining one or more of the components described below. For example, the coatable free-radically polymerizable mixture comprises (1) at least one free-radically polymerizable monomer, (2) optionally, a viscosity modifier, (3) a catalytically effective amount of a free-radical photoinitiator, and (4) optional additives.

(A) Monomer(s)

The polymerizable monomeric mixture comprises at least one free-radically polymerizable monomer. Examples of such monomers include specifically, but not exclusively, the following classes:

Class A—acrylic acid esters of an alkyl alcohol (preferably a non-tertiary alcohol), the alcohol containing from 1 to 14 (preferably from 4 to 14) carbon atoms, the esters including, for example, methyl acrylate, ethyl acrylate, n-butyl acrylate, t-butyl acrylate, hexyl acrylate, isooctyl acrylate, 2-ethylhexyl acrylate, isononyl acrylate, isobornyl acrylate, phenoxyethyl acrylate, decyl acrylate, and dodecyl acrylate.

Class B—methacrylic acid esters of an alkyl alcohol (preferably a non-tertiary alcohol), the alcohol containing from 1 to 14 (preferably from 4 to 14) carbon atoms, the esters including, for example, methyl methacrylate, ethyl methacrylate, n-propyl methacrylate, n-butyl methacrylate, isobutyl methacrylate, t-butyl methacrylate, and dodecyl methacrylate.

Class C—(meth)acrylic acid monoesters of polyhydroxy alkyl alcohols such as 1,2-ethanediol, 1,2-propanediol, 1,3-propane diol, the various butanediols, the various hexanediols, glycerol, and the like, such that the resulting esters are referred to as hydroxyalkyl (meth)acrylates.

Class D—multifunctional (meth)acrylate esters, such as 1,4-butanediol diacrylate, 1,6-hexanediol diacrylate, glycerol diacrylate, glycerol triacrylate, and neopentyl glycol diacrylate;

Class E—macromeric (meth)acrylates, such as (meth)acrylate-terminated styrene oligomers, and (meth)acrylate-terminated polyethers, such as are described in PCT Patent Application WO 84/03837 and European Patent Application EP 140941;

Class F—(meth)acrylic acids and their salts with alkali metals, including, for example, lithium, sodium, and potassium, their salts with alkaline earth metals, including, for example, magnesium, calcium, strontium, and barium, and their salts with other metals such as zinc and aluminum;

Class G—nitrogen-bearing monomers selected from the group consisting of (meth)acrylonitrile, (meth)acrylamide, N-substituted (meth)acrylamides, N,N-disubstituted (meth)acrylamides, the latter of which may include substituents of 5- and 6-membered heterocyclic rings comprising one or more heteroatoms, and methyl-substituted maleonitrile, and N-vinyl lactams, such as N-vinyl pyrrolidinone and N-vinyl caprolactam;

Class H—dibasic acid monomers such as itaconic acid and maleic acid;

Class I—vinyl esters of $C_1$–$C_{20}$ branched or straight-chain substituted or unsubstituted monocarboxylic acids;

Class J—styrenes and ring-substituted styrenes, such as styrene, vinyl toluene, divinyl benzene and alpha-methyl styrene;

Class K—vinyl halides and vinylidene halides; and

Class L—vinyl ethers, such as vinyl butyl ether, 2-ethylhexyl vinyl ether, and isooctyl vinyl ether.

Preferred Class A, B and C monomers include, respectively, methyl acrylate, ethyl acrylate, n-butyl acrylate, t-butyl acrylate, 2-ethylhexyl acrylate, isooctyl acrylate and isononyl acrylate; methyl methacrylate and ethyl methacrylate; and 2-hydroxyethyl acrylate, 2-hydroxypropyl acrylate, 3-hydroxypropyl acrylate, and 4-hydroxybutyl acrylate.

Preferably, the polymerizable mixture may be a mixture of (1) 0–100 parts by weight of one or more Class A monomers, (2) 0–100 parts by weight of one or more of Classes B–I monomers and (3) effective amounts of one or more free-radical photoinitiators. When a mixture of monomers is used for either one or both of components (1) and (2), each mixture is added in the same amount as if a single monomer were used.

(B) Viscosity Modifiers

In a preferred embodiment of the present invention, the viscosity of the polymerizable mixture can be increased to a more desirable level so that it can be handled more conveniently during coating processes. In order to increase the mixture viscosity to a more desirable level, the monomer mixtures can be partially prepolymerized. Prepolymerization can be accomplished by exposure to actinic radiation, by thermal polymerization or a combination thereof. Partial prepolymerization can be accomplished in an inert (nitrogen) atmosphere using ultraviolet-emitting lights to provide coatable syrups of a viscosity (Brookfield) of about 1500 cps. However, other methods of increasing the viscosity of the polymerizable mixture are also available, such as the addition of viscosity-modifying agents such as high molecular weight polymers, or thixotropic agents such as colloidal silicas and the like.

(C) Polymerization Initiators

A photoinitiator acts to absorb and utilize light energy to initiate photopolymerization. Photoinitiators suitable for the process of the present invention are those commonly used to polymerize vinyl compounds and alkyl acrylate monomers. Well-known photoinitiators of this type include but are not limited to acyloin ethers (such as benzoin ethyl ether, benzoin isopropyl ether, anisoin ethyl ether and anisoin isopropyl ether), substituted acyloin ethers (such as alpha-hydroxymethyl benzoin ether), substituted acetophenones (such as 2,2-diethoxyacetophenone and 2,2-dimethoxy-2-phenylacetophenone), substituted alpha ketols (such as 2-methyl-2-hydroxypropiophenone), aromatic sulfonyl chlorides (such as 2-naphthalenesulfonyl chloride), chromophore-substituted vinylhalomethyl-s-triazines, such as 2,4-bis(trichloromethyl)-6-p-methoxystyryl-s-triazine, photoactive oximes (such as benzil 2-O-benzoyloxime), and benzophenones (such as 4,4'-bis(dimethylamino)benzophenone), and the like.

The initiator is present in a catalytically-effective amount, wherein "catalytically-effective amount" means a quantity of initiator sufficient to effect polymerization of the polymerizable composition to a polymerized product at least to such a degree as to cause a significant increase in the viscosity of the composition under the conditions specified. Such amounts are typically in the range of about 0.01 parts to 5 parts, and more preferably in the range from about 0.025 to 2 parts by weight, based upon 100 total parts by weight of monomer or monomer mixture. If a mixture of initiators is used, the total amount of the mixture of initiators would be as if a single initiator were used.

(D) Additives

The polymerizable mixture may also contain one or more crosslinking agents to enhance the cohesive strength of the resulting adhesive or article without unduly affecting its compliance. This can be accomplished by using a crosslinking agent in conjunction with a photoinitiator. Crosslinking agents useful in the invention include, but are not limited to, multifunctional acrylates, such as those selected from the group consisting of $C_1$ to $C_{14}$ alkyl di- and tri-acrylates, including, for example, 1,4-butanediol diacrylate, 1,6-hexanediol diacrylate, 1,6-hexanediol dimethacrylate, 1,8-octanediol diacrylate, neopentyl glycol diacrylate, glycerol diacrylate, and trimethylolpropane triacrylate; bisamides such as methylenebisacrylamide, N,N'-bis-1,2-propyleneterephthalamide; divinylbenzene; benzaldehyde, acetaldehyde, anthraquinone, substituted anthraquinones, various benzophenone-type compounds and certain chromophore-substituted vinylhalomethyl-s-triazines, such as 2,4-bis-(trichloromethyl)-6-p-methoxystyryl-s-triazine. Preferred crosslinking agents in the invention are multifunctional acrylates, most preferably 1,6-hexanediol diacrylate.

When a foam-like material or foam PSA tape is desirable, a polymerizable mixture blended with polymeric or inorganic microspheres may be used. The microspheres may either be solid or hollow and/or tacky or non-tacky. The microspheres should have an average diameter of 10 to 200 micrometers, and comprise from about 5 to about 65 volume percent of the PSA layer. Preferred glass microspheres have average diameters of about 50 micrometers. Especially preferred microspheres are polymeric microspheres, such as those described in U.S. Pat. Nos. 3,615,972, 4,075,238 and 4,287,308. In addition, the foamed materials can be made using frothing processes with conventional gases, such as nitrogen, low-boiling hydrocarbons, or low-boiling (per)fluorinated compounds. Chemical blowing agents may also be used to produce the foamed structures.

Often it is desirable to have adhesives that have a high degree of ionic content, such as for electrically conductive adhesives. In this case, it is desirable that a large portion, typically greater than 50%, of the monomer mixture comprise monomers selected from classes C, F, and G described previously.

Additives useful in the present invention include stabilizers against thermal and UV degradation, such as o-hydroxybenzophenones, cyanoacrylate esters, 2-(o-hydroxyphenyl)benzotriazoles, copolymerizable UV absorbers and the like. Further additives can include fillers, such as fumed silica, hydrophobic silica (U.S. Pat. Nos. 4,710,536 and 4,749,590), alumina, carbon black, and natural and synthetic resins in particulate, flake or fibrous form. For various applications, foaming agents, such as low-boiling hydrocarbons and fluorinated materials; colorants, such as dyes and pigments; flame-retardants; anti-static agents; and coupling agents for additives, such as reactive silanes, may be added. When additives are present, they are added in amounts consistent with the publicly known functional uses of such additives.

Coating and Coating Thicknesses

The liquid polymerizable composition is coated onto a flexible carrier web using any conventional means such as roller coating, dip coating, knife coating, or extrusion coating and subsequently polymerized in a deoxygenated liquid inerting medium. Various flexible carrier webs and liners (also referred to as "substrates" and/or "backings") may be used, including films, (transparent and non-transparent), cloths, papers, non-woven fibrous constructions, metal foils, aligned filaments and the like. The carrier webs are chosen to be compatible with the processing parameters of the present invention. For example, an untreated (non-waterproof) paper liner might not be an appropriate choice when using an aqueous inerting material. As will be appreciated by those skilled in the art, such materials may have low-adhesion surfaces and may be removed after polymerization is complete. Alternatively, one such surface can be a tape backing material.

Typical coating thicknesses are in the range of 50 μm to 5 mm for UV processing conditions.

Deoxygenating Techniques

A web coated with a polymerizable coating composition is then immersed in a deoxygenated liquid inerting medium. In contrast to what is reported in the art, we have found that great care must be taken to exclude molecular oxygen from liquid baths in which free-radical polymerizations are carried out. The inerting medium can be deoxygenated, for example, by bubbling nitrogen gas through the medium, by boiling the inerting medium, by dissolving oxygen-scavenging agents in the inerting medium, or the like, until the concentration of dissolved oxygen is in the range of 200 ppm v/v or less.

Liquid Inerting Media

Particularly useful liquid inerting media include liquid media that, preferably, are nontoxic, do not absorb actinic radiation, do not significantly absorb into the finished product or into the starting monomers, should not appreciably solubilize products or monomers, have a sufficient heat transfer capability (that is, the ability to absorb heat due to the polymerization exotherm), and have a sufficiently high vapor pressure such that any residual liquid inerting medium is relatively easy to remove, although this latter property is not required. While it is desirable that the liquid inerting medium be such that it is easily removed by, e.g. evaporation, this is not a requirement, because the coated web after polymerization can be rinsed as necessary before it is dried. In addition, evaporative removal would be disfavored if the resultant vapor was hazardous or environmentally undesirable.

The particularly useful liquid inerting media fall into two classes: (a) aqueous systems and (b) non-aqueous systems. Aqueous systems can include for example, (1) pure water, (2) aqueous salt solutions, (3) solutions of organic solvents in water, or (4) a combination thereof.

Aqueous salt solutions useful in the present invention are those that are of low solvency towards, i.e., effectively prevent dissolution of, water-soluble monomers (e.g., acrylic acid), typically by salting-out mechanisms. Salts whose solutions are useful, therefore, typically meet several criteria: (1) their aqueous solutions preferably are rather acidic (pH typically less than 3); (2) they are highly soluble in water; (3) they preferably possess monovalent cations; and (4) they must substantially limit the solubility of acrylic acid and other water-miscible or substantially water soluble polar monomers in their concentrated aqueous solutions. The combination of decreasing the pH and/or increasing the ionic strength of the aqueous solutions is especially effective in the salting-out process of the present invention.

Generally, aqueous salt solutions useful in the invention are chosen to minimize the solubility of acrylic acid therein. Typically, methacrylic acid and other water-soluble monomers that are less powerfully hydrophilic than acrylic acid are less soluble than is acrylic acid in the low-solvency aqueous salt solutions described herein. Therefore, they may be employed in similar polymerization systems which, owing to choice of salt or to a lower salt concentration, would be only marginally useful with acrylic acid.

It is to be understood that, if basic (as opposed to acidic) monomers are to be used, neutral or even basic aqueous salt solutions are typically required, rather than the acidic salt solutions described herein.

Polymerizable systems comprising monomer mixtures are also included within the present invention. In particular, those systems comprising acrylic acid and at least one acrylate ester copolymerizable therewith are included. In the case where the second monomer is essentially immiscible with water and is of low polarity, acrylic acid will be only moderately soluble therein and will be extracted to a considerable extent from such a mixture into water. This will be especially true for exposed surfaces of the relatively thin coatings intended, upon polymerization, to become useful pressure-sensitive adhesives (PSAs). It is well known that, by maintaining a substantial percentage of copolymerized acrylic acid throughout the PSA, the useful properties thereof are enhanced. Any depletion of acrylic acid at the exposed adhesive interface is known to be especially damaging.

Therefore, it is desirable that an aqueous system in contact with such a monomer mixture exhibit only a slight solubility toward acrylic acid. Having established that acrylic acid exhibits decreased solubility in certain concentrated or saturated inorganic salt solutions, one method of determining the suitability of any salt solution is to perform a simple phase-separation test with equal volumes of salt solution and glacial acrylic acid. Concentrated salt solutions that form two-phase systems with glacial acrylic acid are especially preferred as liquid inerting media.

Saturated salt solutions useful in the invention can be identified by measuring the degree of solubility of acrylic acid therein. Typically, three parts by volume of concentrated, saturated, or supersaturated (where stable under conditions of the experiment) salt solution are equilibrated with one part by volume of 99+% pure acrylic acid at room temperature for at least several minutes. Alternatively, equal volumes of the components may be so equilibrated. Samples from each phase are analyzed for their elemental composition, preferably by inductively-coupled-plasma (ICP) spectroscopy, from which data the equilibrated composition is determined. Saturated salt solutions in which the concentration of dissolved acrylic acid reaches saturation at about 6% or less are particularly preferred for processes of the invention. The pH of the saturated solution is measured by ColorpHast® test strips (available from EM Industries, Gibbstown, N.J.); saturated salt solutions that are particularly preferred in the invention are those exhibiting a pH of less than about 3. Table 1 illustrates some typical salt solutions and their saturation solubility for acrylic acid, as determined by this method.

TABLE 1

| Salt | Salt Conc. in aq. phase, % | Acrylic Acid Conc. in aq. phase, % |
|---|---|---|
| NaHSO$_4$ | 48 | 6.0 |
| NaH$_2$PO$_4$ | 53 | approx. 1 |
| Na$_2$SO$_4$ | 29 | 3.6 |
| Salt Mix #1[1] | 47 | 3.7 |
| Salt Mix #2[2] | 53 | 3.4 |

[1] 24% NaH$_2$PO$_4$, 8% H$_3$PO$_4$, and 15% NaHSO$_4$
[2] 30% NaH$_2$PO$_4$, 12% H$_3$PO$_4$, and 11% NaHSO$_4$ For basic monomers, an entirely analogous test using non-acidic aqueous salt solutions and a hydrophilic basic monomer would be substituted for the foregoing test.

Through relatively simple experimentation, it is possible to establish an equilibrium constant, $K_p$, describing the relative solubility of acrylic acid and/or other polar monomers in an acidic concentrated aqueous salt solution such as those described above vs. a comonomer such as isooctyl acrylate (IOA) or 2-ethylhexyl acrylate (EHA). For instance, a salt solution is contacted with three times its volume of a 10 wt. % solution of acrylic acid in, e.g., EHA (commercially available from Aldrich Chemical Co., Milwaukee, Wis.), for a time sufficient to establish equilibrium, typically less than two hours. A sufficient weighed sample is taken from the aqueous phase and diluted to volume with organic-free deionized water, then subjected to elemental analysis by ICP, as previously described. Standardization is done with acrylic acid, and "matrix effects" must be corrected for as appropriate. Aqueous salt solutions that produce an equilibrium constant of less than 1.0 are preferred to water as an inerting and heat-transfer medium in the present invention. Aqueous salt solutions producing an equilibrium constant of less than 0.7 are more preferred, and those producing an equilibrium constant of less than 0.5 are most preferred.

$K_p = \%AA_w/\%AA_o$ $\%AA_w = 100(AA)_w/[(AA)_w+(W)_w+(S)_w+(O)_w]$ $\%AA_o = 100(AA)_o/[(AA)_o+(W)_o+(S)_o+(O)_o]$ wherein AA=acrylic acid, W=H$_2$O, S=salt and O=organic monomer Table 2 shows typical equilibrium and $K_p$ data for selected salt solutions in equilibrium with a 91:9 mixture of isooctyl acrylate and acrylic acid that had been polymerized to approximately 8% by UV irradiation (as described in the Experimental section).

TABLE 2

| Salt | % Salt in aq. phase | % Acrylic Acid in aq. phase | $K_p$ |
|---|---|---|---|
| NaHSO$_4$ | 50 | 2.7 | 0.41 |
| NaH$_2$PO$_4$ | 50 | 1.5 | 0.21 |
| NH$_4$HSO$_4$ | 60 | 3.9 | 0.64 |
| NH$_4$SO$_3$NH$_2$ | 60 | 2.4 | 0.35 |
| KI | 60 | 3.4 | 0.57 |
| NaBr | 50 | 2.3 | 0.34 |
| H$_2$SO$_4$ | 65 | 4.2 | 0.72 |
| H$_3$PO$_4$ | 85 | 5.3 | 1.02 |
| H$_2$O* | — | 11.1 | 1.5 |
| H$_2$O** | — | 8.5 | 1.7 |

*H$_2$O/IOA = 0.062
**H$_2$O/IOA = 0.4

As shown in Table 2, a number of common salts provide $K_p$ values of less than about 0.7, any of which would be adequate for the inerting fluid of the invention. Also, a saturated solution of a strong, ionized acid is seen not to be sufficient, and would also be less safe, as an inerting fluid. Finally, the equilibrium constant for acrylic acid between pure water and pure isooctyl acrylate is seen to be about 1.6 over a large range of water/IOA ratios, thus indicating the ease with which acrylic acid is extracted from IOA into water.

Salts especially useful for preparing acidified aqueous solutions include but are not limited to NaHSO$_4$, NH$_4$HSO$_4$, NaH$_2$PO$_4$ and CsHSO$_4$. Salts that are substantially pH-neutral may be useful in the present invention, and include but are not limited to NH$_4$SO$_3$NH$_2$, LiSO$_3$NH$_2$, LiCl, NaSO$_3$NH$_2$, Na$_2$SO$_4$ and (NH$_4$)$_2$SO$_4$. More preferred salts include NaHSO$_4$ and NaH$_2$PO$_4$, for reasons of availability, favorably low pH of their solutions, and their low cost. Mixtures of these salts among themselves and with other salts typically will also be effective, when the mixtures also satisfy the above criteria.

Minor amounts of additive salts such as NaHSO$_3$ and NaH$_2$PO$_3$ that have potentially useful deoxygenating, anti-corrosion or aqueous-polymerization-inhibiting properties may also enhance the above-described salting-out effect. Inclusion of polymerization-inducing salts such as ammonium persulfate may have the additional beneficial effect of copolymerizing acrylic acid at the surface of a coated web immersed in a liquid inerting medium of the invention.

Because the solubility of both inorganic salts and organic monomers varies with temperature, tests of the workability of a particular system should ideally be done at the working temperature of the system. However, measurements made at 25° C. will be generally indicative of workability.

Useful water-miscible or water-soluble organic solvents include but are not limited to ethylene glycol, propylene glycol, glycerol, and the like. In some cases, these solvents may be present in the aqueous salt solutions described above. Non-aqueous systems can include for example, (1) fluorinated and/or perfluorinated liquids such as Fluorinert™ 77 (commercially available from 3M, St. Paul, Minn.), or (2) liquid siloxanes including, but not limited to, hexamethyldisiloxane and polysiloxanes, including cyclic siloxanes and silicone fluids.

While liquid inerting media may be maintained at any temperature between their boiling and freezing points, temperatures near the boiling point are typically preferred because oxygen solubility is decreased. However, the solubility of the polymerizable monomers often tend to increase with increased temperature and should be taken into account when choosing a bath temperature.

Maintaining a Deoxygenated Inerting Medium

Prior to and during the polymerization process, the inerting medium may be maintained effectively oxygen-free (i.e., dissolved molecular oxygen concentration is less than 200 ppm) by continual sparging with nitrogen or argon, by maintaining a nitrogen blanket over the surface of the liquid inerting medium, or by covering the surface of the immersion bath so as to exclude air or oxygen, the covering being impermeable to oxygen. Other means, such as chemical absorption of or reaction with oxygen, may be used separately or together with the aforementioned methods.

Actinic Radiation

After the web has been coated and immersed, the coated polymerizable composition is irradiated to effect polymerization. Radiation sources emitting active radiation in the ultraviolet and visible region of the spectrum (for example, about 200 to 800 nm, preferably between about 250 and 450 nm) can be used. Suitable sources of radiation include mercury vapor discharge lamps, carbon arcs, tungsten lamps, xenon lamps, lasers, sunlight, etc. The necessary amount of exposure to effect polymerization is dependent upon such factors as the identity and concentration of the photoinitiator, the particular free-radically polymerizable monomers, the thickness of the exposed material, the type of substrate, the intensity of the incident radiation and its wavelength distribution, and the amount of heat associated with the radiation.

Commercially available fluorescent UV-emitting lights with emission maxima at 350 nm, wherein at least 75% of the emissions are between 300 and 400 nm, are used in the examples illustrating this invention. In general, total radiation dosage in the range of about 200–1000 milliJoules/cm$^2$ may be used. Preferably, at least about 90% of the radiation emitted is between 300 and 400 nm. Maximal efficiency, i.e., full cure throughout the coating thickness, and overall rate of polymerization is dictated by the relationship between emission properties of the radiation source and the absorption properties of the photoactive compounds employed.

Final Processing

When the coating on the web has been polymerized and moved out of the immersion bath, bath liquid can be removed from the coated article by evaporation in stationary air, by forced-air drying, or the like. To remove non-volatile residuals carried from the immersion bath, the coated article may be rinsed first and then dried. Any techniques known to those skilled in the art that can be used to remove, rinse and/or dry the polymerized, coated article may be used, provided such techniques do not detrimentally alter this coated article.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

| Glossary | |
|---|---|
| KB-1 | 2,2-dimethoxy-2-phenyl acetophenone commercially available from Sartomer Chemicals |
| Fluorinert ™ 77 | a volatile perfluorinated solvent commercially available from 3M |
| HDDA | 1,6-hexanedioldiacrylate |
| PET | polyethylene terephthalate |
| IOA | isooctylacrylate |
| AA | acrylic acid |
| PSA | Pressure Sensitive Adhesive |
| ICP | Inductively Couple Plasma |
| EHA | (2-ethylhexyl)acrylate |

Static Shear Value at 70° C. and at 23° C.

A flat, rigid stainless steel coupon measuring 12.7 mm×50.8 mm×0.05 mm is cleaned and bonded to a strip of anodized aluminum measuring 12.7 mm× 50.8 mm×0.05 mm by a 12.7 mm×25.4 mm piece of the adhesive layer to be tested such that all of the adhesive layer is in contact with both metal surfaces, and only the bonded surfaces overlap. Before testing, a 2.35 kg roller is applied once in each direction over the bonded area. Then the bonded sample is placed in an air-circulating oven that has been preheated to 70° C. and a 500 g weight is hung from the free end of the aluminum strip while the free end of the stainless steel coupon is attached vertically to a timing device. The time at which the weight falls is the "Static Shear Value at 70° C." If no failure is observed, the test is discontinued after 10,000 minutes.

When tested at 23° C., the sample is similarly disposed, except that a 1000 g weight is hung from the aluminum strip. The time at which the weight falls is the "Static Shear Value at Room Temperature." If no failure is observed, the test is discontinued at 10,000 minutes.

90° Peel

The adhesive layer to be tested is transferred onto a 0.05 mm thick soft aluminum foil that is slit to a width of 12.7 mm. The resulting metal tape is self-adhered to a stainless steel plate under the weight of a 2.35 kg hard-rubber-covered steel roller, one pass in each direction. After dwelling at 23° C. for 72 hours, the "90° Peel" is measured by moving the free end of the tape away from the stainless steel plate at a 90° angle at a rate of about 0.5 cm per second using an Instron tensile tester. Results are reported in Newtons/decimeter (N/dm).

EXAMPLES

EXAMPLE 1

A mixture of 90 parts isooctyl acrylate, 10 parts acrylic acid and 0.05 parts KB-1 photoinitiator was prepared and stirred under nitrogen at room temperature, then irradiated with two fluorescent UV lamps (Sylvania F20T 12BL) with stirring until the Brookfield viscosity of the syrup reached about 1500 cp.

To 100 parts of 90/10 syrup was added 0.1 parts of KB-1, and 0.5 parts of HDDA. The mixture was then knife coated at a thickness of 0.125 mm (5 mils) onto a single silicone-treated PET carrier web. The carrier web was then placed into a container of a concentrated aqueous sodium bisulfate solution at room temperature (about 25° C.) and at a water depth of about 6 mm (0.25 in). The bisulfate solution had been previously deoxygenated to a dissolved molecular oxygen content of less than 200 ppm by sparging nitrogen through it for at least 10 minutes. The sample was irradiated for 10 minutes while thus submerged, by means of two fluorescent UV lamps (Sylvania F20T12BL) at a distance of 7.5 cm (3 in.) from the web. The resulting PSA was rinsed twice with DI water, then air dried. A free-standing PSA film was obtained by removing the sample from the web. The film was tested for peel adhesion, static shear and % residuals as shown in Table 3. This Example showed good PSA properties.

EXAMPLE 2

To 100 parts of the 90/10 syrup described in Example 1 were added 0.1 parts of KB-1, and 0.5 parts HDDA. The mixture was then knife coated at a thickness of 0.125 mm (5 mils) onto a single silicone-treated PET carrier web. The carrier web was then placed into a container of room temperature water that had previously been deoxygenated by bubbling nitrogen through it for about 10 minutes, at a water depth of about 6 mm (0.25 in). The sample was irradiated for about 10 minutes by means of two fluorescent UV lamps (Sylvania F20T12BL) at a distance of about 7.5 cm (3 in) from the web. The resulting PSA was air dried and removed from the carrier web. A free-standing film was obtained. The film was tested for peel adhesion, static shear and % residuals as shown in Table 3. This example shows the detrimental effect of using water rather than a concentrated aqueous salt bath as the inerting medium. This was evidenced by the strong odor of AA in the water bath after the PSA was removed. The resulting polymer was no longer a 90/10 formulation at its surface, since the AA had been depleted from the surface of the coated formulation prior to polymerization due to the much greater solubility of AA in water as compared to that in concentrated aqueous sodium bisulfate (Example 1).

EXAMPLE 3

To 100 parts of the 90/10 syrup described in Example 1 were added 0.1 parts of KB-1 and 0.5 parts of HDDA. The mixture was then knife coated at a thickness of 0.125 mm (5 mils) onto a single silicone-treated PET carrier web. The carrier web was then placed into a container of room temperature Fluorinert™ 77 that had been freshly boiled and sparged with nitrogen for about 10 minutes, at a depth of about 6 mm (0.25 in). Then, the container and web, and the UV lights (below), were enclosed in a clear poly bag filled with nitrogen. The sample was irradiated for 10 minutes by means of two fluorescent UV lamps (Sylvania F20T12BL) at a distance of 7.5 cm (3 in.) from the web. The resulting polymer was air dried. A free standing film with poor film properties (e.g., the film had very little internal or structural cohesiveness) was obtained that could only be removed from the carrier web after cooling to ca. −78° C. The film was tested for peel adhesion, static shear and % residuals as shown in Table 3. The relatively poor PSA properties shown for this Example in Table 1 are attributed to the difficulty in removing all oxygen from the Fluorinert™ 77 inerting bath, and the rapidity with which this inerting material reabsorbs oxygen.

Comparative Example A

To 100 parts of the 90/10 syrup described in Example 1 were added 0.1 parts of KB-1 and 0.5 parts HDDA. The mixture was then knife coated at a thickness of 0.125 mm (5 mils) onto a single silicone-treated PET carrier web. The carrier web was then placed into a container of room temperature water at a depth of about 6 mm (0.25 in). The sample was irradiated for 10 minutes by means of two fluorescent UV lamps (Sylvania F20T12BL) at a distance of about 7.5 cm (3 in.) from the web. The resulting polymer was air dried. A film with poor film properties was obtained that could only be removed from the carrier web upon cooling to ca. −78° C. The film was tested for peel adhesion, static shear and % residuals as shown in Table 3. Material prepared according to this example had no shear holding properties and low peel force, and was not a useful PSA. This may be attributed to significant leaching of AA into the aqueous inerting medium (the inerting medium smelled strongly of AA after completion of the polymerization and removal of the sample) as well as to the considerable presence of oxygen in the untreated inerting medium.

TABLE 3

| Ex-ample | Weight Loss (%) | Shear @ 23° C. (min.)* | Shear @ 70° C. (min.)* | Peel Force (N/dm) |
|---|---|---|---|---|
| 1 | 0.4 | 10,000 | 10,000 | 114 |
| 2 | — | 5,000 | 20 | 96.8 |
| 3 | 0.4 | 2,800 | 80 | 128.5 |
| A | 3.1 | <1 | <1 | 25.3 |

*Cohesive failure

Example 4 and Comparative Examples B, C and D

EXAMPLE 4

A mixture of 65 parts of isooctylacrylate (IOA), 35 parts of isobornylacrylate (IBA) and 0.04 parts of KB-1 photoinitiator was partially polymerized to a viscosity of about 1500 cps under a nitrogen atmosphere by irradiation with two fluorescent UV light-emitting lamps (Sylvania F20T12BL) with stirring. An additional 0.1 parts of KB-1 and 0.5 parts of HDDA was then added to the syrup. The sample was degassed just prior to coating using vacuum to remove dissolved gases. The mixture was then knife coated at a thickness of 0.127 mm onto a single silicone-treated PET carrier web. The carrier web was then placed in a saturated aqueous solution of $NaHSO_4$. The sample was then irradiated for 10 minutes with two fluorescent UV light-emitting lamps (Sylvania F20T 12BL) at a distance of 75 mm from the web. The resulting PSA was removed from the water bath and air dried. A free-standing PSA film was obtained by removing the sample from the web. The PSA sample was tested for static shear and peel to stainless steel. Test results are shown in Table 4. This example shows that using a saturated solution of $NaHSO_4$ in tap water does not improve the PSA properties of an adhesive that does not contain a polar water soluble component such as acrylic acid.

Comparative Example B

A PSA sample was prepared and tested as described in Example 4, except that the carrier web was placed into a container of room temperature water at a water depth of 19 mm. The water was degassed by sparging with nitrogen for at least five minutes prior to immersion of the carrier web in the water. The film was tested for static shear and peel to stainless steel. Test results are shown in Table 4. Adhesives made with non-polar monomers do not perform as well as adhesives made with polar monomers.

Comparative Example C

A PSA sample was prepared as described in Example 4 except that the adhesive was sandwiched between two silicone-treated PET carrier webs prior to curing. Thus, the monomer mixture was not exposed to water during cure. The sample was tested for static shear and peel to stainless steel. Test results are shown in Table 4. This example shows that non-polar adhesives have similar properties when cured open face under water or when cured between two liners.

TABLE 4

|  | Peel Force N/dM | Shear @ 25C min.* | Shear at 70C min.* | Residuals % |
| --- | --- | --- | --- | --- |
| Example 4 | 53.23 | 200 | 14 | — |
| Comparative Example B | 62.24 | 390 | 44 | 2.3 |
| Comparative Example C | 47.87 | 175 | 1000 | — |

*Adhesive failure

Example 4 and Comparative Example B show that the improved adhesives obtained when polymerization is carried out in a saturated salt solution is not due to an effect of the salt solution itself on the PSA, since the PSAs of these Examples all exhibit approximately identical PSA properties. Comparative Example C shows that a PSA prepared using a method that excludes both oxygen and water from contact with the monomers has properties approximately equal to one prepared in a sparged salt solution. These examples also show that a PSA prepared from only non-polar monomers exhibits generally poorer PSA properties than one prepared from at least one polar monomer such as acrylic acid.

Open-face curing of acrylic PSAs has been achieved using water, aqueous salt solutions and Fluorinert™ solvents as the inerting media. However, high performance acrylic PSAs, particularly those using polar monomers and as evidenced by shear and peel data were only achieved when the fluid medium was deoxygenated. If AA is present in the formulation, an aqueous solution that "salts out" AA is especially preferred to reduce its solubility in the aqueous medium.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A process for polymerizing a free-radically polymerizable composition comprising the steps:
   (a) coating a coatable free-radically polymerizable mixture onto at least one major surface of a web;
   (b) deoxygenating a liquid inerting medium;
   (c) immersing the coated web into the deoxygenated liquid inerting medium; and
   (d) irradiating the immersed coated web with actinic radiation sufficient to effect polymerization of the free-radically polymerizable mixture, while maintaining the liquid inerting medium in an essentially oxygen-free state.

2. The process according to claim 1 wherein the coatable free-radically polymerizable mixture comprises (1) at least one free-radically polymerizable monomer, (2) optionally, a viscosity modifier, (3) a catalytically effective amount of a free radical photoinitiator, and (4) optional additives.

3. The process according to claim 1 wherein the liquid inerting medium is (1) water, (2) a concentrated aqueous salt solution, (3) an organic solvent, or (4) a combination thereof.

4. The process according to claim 3 wherein the concentrated aqueous salt solution is an aqueous solution of salts selected from the group consisting of $NaHSO_4$, $NH_4HSO_4$, $NaH_2PO_4$, $CsHSO_4$, $NH_4SO_3NH_2$, $LiSO_3NH_2$, $LiCl$, $NaSO_3NH_2$, $Na_2SO_4$ and $(NH_4)_2SO_4$.

5. The process according to claim 3 wherein the concentrated aqueous salt solution is an aqueous solution of salts selected from the group consisting of $NaHSO_4$, $NH_4HSO_4$, $NaH_2PO_4$, and $CsHSO_4$.

6. The process according to claim 3 wherein the concentrated aqueous salt solution is chosen so that a polar, water-miscible organic monomer exhibits an equilibrium constant Kp of less than 0.7 when partitioned between a non-polar organic monomer and the concentrated aqueous salt solution.

7. The process according to claim 3 wherein the concentrated aqueous salt solution dissolves not more than 6% by weight of acrylic acid.

8. The process according to claim 3 wherein a polar, water-miscible organic monomer exhibits an equilibrium constant Kp of less than 0.7 when partitioned between a non-polar organic monomer and the concentrated aqueous salt solution.

9. The process according to claim 1 wherein the liquid inerting medium is a perfluorinated, fluorinated or polysiloxane liquid.

* * * * *